Patented June 19, 1928.

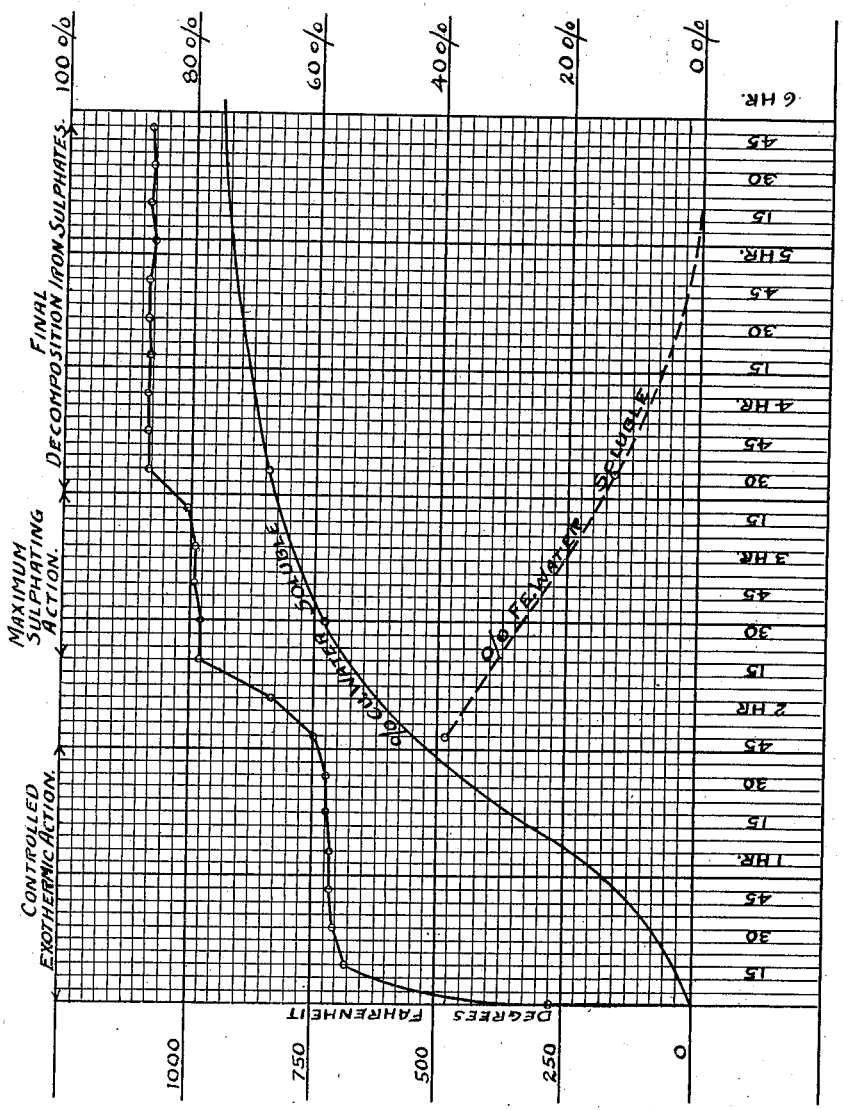

1,674,491

UNITED STATES PATENT OFFICE.

HERBERT E. WETHERBEE, OF CLEVELAND, OHIO.

METHOD OF TREATING METALLIFEROUS SULPHIDES.

Application filed December 14, 1926. Serial No. 154,824.

My invention relates to improvements in method of treating metalliferous sulphides, and as particularly applied, to treating and roasting high grade ores and concentrates containing the sulphide minerals of iron and copper, by way of example.

An object of this invention is to render the desired metallic compounds soluble in water or dilute acid, and to leave the iron compounds practically inert to these solvents so that a leach solution may readily be formed.

A further object of said invention is to render so large a portion of the copper compounds readily soluble that a rich leach solution may readily be formed, adapted for electrolytic deposition under conditions of high current efficiency.

An additional object of this invention is to produce a roasted material that is porous and settles easily, in order that it may readily be leached in a continuous, countercurrent, decantation apparatus or the like.

A still further object of my invention is to effect the maximum sulphating action on the copper or other recovered metal and to prevent the formation of residual magnetic oxide of iron.

The intermediate stage of roasting, in my improved method, particularly lends itself to the careful regulation of temperatures whereby sulphur trioxide is most economically and efficiently produced by catalytic action.

In all prior methods known to me involving the roasting and leaching of copper ores and concentrates, primarily for the electrolytic deposition of copper from the leached solutions using insoluble anodes therefor, the iron content of the solution is found to be so high as to necessitate the use of a reducing agent in the electrolytic cells for maintaining the iron in the ferrous condition. The reducing agent most commonly employed for this purpose is sulphur dioxide.

As herein exemplified, my instant invention contemplates oxidation of copper ores and concentrates by roasting in pre-determined steps or stages under carefully controlled conditions of temperature, elapsed time and access of air at the different stages, so that a negligible amount of iron persists in soluble condition, and the subsequent use of a reducing agent is not required.

Prior practice with respect to ores and concentrates having a low copper content successfuly employs initial high temperatures, within certain limits, in commercial roasting methods without undesirable results. However, similar methods applied to rich copper ores and concentrates, involving initial high temperatures, result in a roasted product containing undecomposed sulphide particles and iron in the highly undesirable form of black magnetic oxide, $Fe_3O_4$, which is soluble in the ordinary solvents for copper, whereas the iron preferably should be entirely in the form of ferric oxide, $Fe_2O_3$.

Accordingly, I have devised a method of treating and roasting metallic sulphides which may be broadly divided into three separate stages for the ultimate production of a roasted ore or concentrate which contains the iron combined as ferric oxide, insuring a leach solution rich in copper and especially adapted for electrolytic deposition. These three stages, briefly described, comprise an initial heating at a relatively low temperature with sufficient time and with just sufficient air to slowly oxidize and eliminate the readily eliminated sulphur atom while controlling the exothermic action as far as practicable. It is understood that temperature control may be maintained otherwise than by control of access of air and whenever control by access of air is referred to herein, it shall be taken to mean control by access of air or any other practicable means. The second stage is conducted at a materially higher regulated temperature with free access of air and with sufficient time for the elimination of such additional sulphur as may be eliminated as $SO_2$ while insuring the maximum sulphating action on the copper, and meantime preventing the formation of residual magnetic oxide of iron and at the same time maintaining the best possible conditions for the conversion to $Fe_2O_3$ of any $Fe_3O_4$ which might previously have been formed. The temperatures used at this stage range from 940° F. to 1040° F., more or less. The third stage proceeds at a still higher temperature, but below 1200° F., to decompose the iron sulphates finally to the insoluble ferric oxide.

A typical example is set forth in the accompanying drawing incorporating graphs to show not only the elapsed time and temperatures, but the water soluble copper and iron contents in their respective proportions.

In practicing my improved method I have availed of the fact that one atom of sulphur in pyrite, $FeS_2$, or chalcopyrite, $CuFeS_2$, is more loosely combined than is the second atom, and that the former may readily be eliminated by roasting at comparatively low temperatures. The combustion of this readily liberated volume of sulphur, however, generates heat very actively, and unless the temperature at this stage of the roast is carefully controlled, black magnetic oxide of iron, $Fe_3O_4$, is formed.

Roasting essentially is oxidation, the initial result in practicing most methods being the combination of the easily liberated atom of sulphur with oxygen from the air and the formation of gaseous sulphur dioxide, normally accompanied by marked exothermic conditions. Sulphur dioxide is a powerful reducing agent, and, even in small proportions mingled with air, it exerts a decided retarding action on the oxidation of iron to the ferric condition, so that any magnetic oxide, $Fe_3O_4$, formed during the initial stage of the roast will present a serious problem.

Accordingly, the preferred conditions for roasting rich copper-iron sulphides involve a low initial temperature with just sufficient access of air, gradually to oxidize the easily liberated atom or portion of sulphur. This avoids what otherwise may become a rapid self-accelerating oxidation at higher temperature. Instead, the temperature preferably is maintained constant until this portion of the sulphur is eliminated, ranging from 675° F. to 750° F., maintained for one hour and three quarters, under the conditions obtaining in the roast indicated by the graph. During this period of the roast one atom of sulphur is oxidized to sulphur dioxide, $SO_2$, and cuprous sulphide, $Cu_2S$, ferrous sulphate, $FeSO_4$, and copper sulphate, $CuSO_4$, are produced. The reaction that takes place may be written as follows:

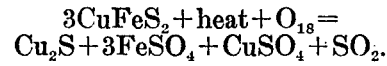

$$3CuFeS_2 + heat + O_{18} = Cu_2S + 3FeSO_4 + CuSO_4 + SO_2.$$

As a second heating stage, the temperature is further raised with free access of air and somewhat rapidly to the maximum sulphating stage, ranging from 975° F. to 1000° F., preferably for the most economic and efficient operation, as will be further explained, although said temperature optionally may be increased with different ores and concentrates to 1040° F., during which additional sulphur is eliminated from the sulphide particles and the $SO_2$ no longer is driven off after heating for an hour, more or less, under the conditions obtaining in the roast indicated by the graph.

It will be observed from said graph that the temperature changes from stage to stage, as is typical with the method of my invention, are relatively rapid in order to obtain the best results. Of course, the temperature of the ore body itself may not be abruptly elevated from one stage to another and must depend upon the depth or volume of said ore body and the rabbling, as well as other conditions then obtaining, but it is quite desirable that the critical temperatures shall be quickly established therein to prevent any material breaking down of the intermediate basic sulphates of iron and the formation of the soluble magnetic oxides of iron.

This essential step in the roasting operation must be carefully conducted for attaining the desired results. The temperatures employed and the conditions of the roast with free access of air are carefully regulated to secure the maximum sulphating action on the copper and to prevent the formation of residual magnetic oxide of iron and to maintain the best possible conditions for the conversion to $Fe_2O_3$ of any $Fe_3O_4$ which might previously have been formed as previously indicated.

It is well known that heated copper-iron oxides are efficient catalytic agents for the formation of sulphur trioxide, $SO_3$, from sulphur dioxide and the oxygen of the air, and that the percentage conversion of sulphur dioxide to sulphur trioxide with this material as a catalyst is greatly influenced by the temperatures employed. Rideal and Taylor, in "Catalysis in Theory and Practice", p. 84, exhibit a graph giving the conversions, supra, from 752° F. to 1292° F. The per cent conversion, according to their graph, for various temperatures, is as follows:

| | Per cent. |
|---|---|
| 752° F | 16 |
| 842° F | 20 |
| 932° F | 37 |
| 1022° F | 46 |
| 1112° F | 38 |
| 1202° F | 25 |
| 1292° F | 17 |

Accordingly, it is seen that the per cent conversion reaches its maximum in the neighborhood of 1022° F.

It will be readily understood that the percentage of conversion of $SO_2$ to $SO_3$ at various temperatures above specified, means at all times the percentage of the total $SO_2$ available. Since the $SO_3$ as it is formed combines with the copper to form copper sulphate, the catalyzed formation of $SO_2$ to $SO_3$ can proceed as a continuing process due to the continuous depletion of the $SO_3$. Since $SO_2$ is a powerful reducing agent and since it is desired to produce conditions of oxidation rather than reduction, it will be seen that at temperatures approximating 1000° F. the best possible conditions will be attained. Conditions at temperatures approximating 1000° F. produce maximum conversion of $SO_2$ to $SO_3$ which coupled with the oxidizing action of the air turn the balance in favor of oxidation as against reduction. With these facts in hand it will be apparent that a three stage roast presents the only solution of the soluble iron problem in roasting operations. It will be particularly noted that the intermediate stage of the roast must be established and maintained at temperatures approximating 1000° F. until all the sulphur which may be eliminated as $SO_2$ has been eliminated. Ignorance of this fact accounts, in large measure, for the soluble iron in the great number of roasts heretofore devised.

Another factor which is important in determining the temperatures to be employed during this intermediate stage of the roast resides in the decomposition by heat of the ferrous sulphate which has been formed in the first stage of the roast. Ferrous sulphate, when heated, first decomposes into a basic sulphate, $Fe_2O_3 2SO_3$. This decomposition commences in the first stage of the roast and is vigorous in the second stage at the temperature range of 975° F. to 1000° F. At these temperatures there also is sufficient decomposition of the basic sulphate to ferric oxide, $Fe_2O_3$, to produce the required quantity of catalyst, but most of the iron is held in such form that it is not readily reduced to the magnetic oxide, and even if some of the iron is so reduced, the conditions in the furnace during this period of the roast are so strongly oxidizing, due to the free access of air and the depletion of the sulphur dioxide, owing to the desirably large conversion to sulphur trioxide, that any magnetic oxide formed is quickly converted back to ferric oxide.

The reactions that take place in this stage of the roast are complicated but may be summarized as follows:

Cuprous sulphide is converted to cuprous oxide and sulphur dioxide.

$$Cu_2S + O_3 = Cu_2O + SO_2$$

Cuprous oxide and sulphur dioxide are catalytically oxidized to cupric oxide and sulphur trioxide.

$$Cu_2O + SO_2 + O_2 = 2CuO + SO_3.$$

Cupric oxide and sulphur trioxide unite to form copper sulphate.

$$CuO + SO_3 = CuSO_4$$

Finally, the temperature is further raised, ranging from 1040° F. to 1125° F., carefully observing conditions to make sure that the critical temperature of 1200° F. is not reached at any time during the two hours and a half final heating with free access of air under the conditions obtaining in the roast indicated by the graph.

During this stage of the roast the basic iron sulphate $Fe_2O_3 2SO_3$ which has been formed during the prior stages of the roast is decomposed with the formation of ferric oxide and sulphur trioxide.

$$Fe_2O_3 2SO_3 = Fe_2O_3 + 2SO_3$$

The sulphur trioxide unites with additional cupric oxide to form copper sulphate.

$$CuO + SO_3 = CuSO_4.$$

The foregoing temperatures and periods of heating, however, are not fixed, since merely a typical example, shown by the graph, has been adopted for illustration. The conditions of rabbling, the thickness of the ore bed in the furnace, the subdivision of the ore, and the particular metallic sulphides, vary the treating and heating conditions to some extent, as well as the periods of heating.

It will be found that my process produces a roasted material that is porous, and readily dissolved, while the insoluble solid portions readily settle after leaching is accomplished preferably in suitable decantation apparatus adapted for continuous operation.

Accordingly, it is practicable to roast rich copper concentrates and obtain 76.4% of the copper in water soluble form and a total of 98.8% of the copper in dilute acid soluble form, as shown by the lower lines of the graph in the particular instance selected for illustration. On the contrary, the iron present in the solution is negligible, as is necessary for electrolytic deposition of the desired metal, such as copper, zinc, or other metals to be produced in a pure state.

From the foregoing it will be understood that the present invention contemplates a method proceeding by three distinct steps or stages having separate definite results to be accomplished. Thus the treated material is first roasted at such temperatures and with regulated access of air that the easily liberated atom or portion of sulphur is gradually oxidized, meantime controlling exothermic action as far as possible. Next, the temperature is increased for the purpose of driving off the additional sulphur, which may be eliminated as $SO_2$, preferably under conditions insuring approximately the maximum sulphating action, and finally the temperature is again raised, short of 1200° F., in order to decompose the persisting iron sulphates and insure a porous and readily treated leachable product.

It should be emphasized that the intermediate or second stage is the most important and critical of this three-stage method of roasting, involving the removal of the more tightly bound atom of sulphur during a substantially static higher temperature maintained until said sulphur has been eliminated from the sulphide under treatment. This temperature, moreover, is maintained within the indicated range producing maximum conditions of oxidation, while at the same time it is held sufficiently low to prevent any serious breaking down of the intermediate basic sulphates of iron which have been formed, and thereby preventing the formation of the soluble magnetic oxides of iron. These results are wholly unobtainable under conditions involving gradually mounting temperatures between the minimum and maximum limits, as opposed to three-stage roasting at approximately static temperature ranges successively maintained within the limits defined.

Having now set forth the preferred procedure of my invention and stated the principles thereof, as understood, I claim as new and desire to secure by Letters Patent, the following:

1. The method of treating metalliferous sulphides, which consists in heating the same under conditions whereby exothermic action substantially is controlled, then heating the sulphides at a higher temperature stage approximating 1000° F. for the maximum sulphating action, and thereafter heating said sulphides at temperatures under 1200° F. until the persisting iron sulphates are decomposed, the temperature changes from stage to stage being relatively abrupt, substantially as set forth.

2. The method of treating metalliferous sulphides, which consists in heating the same at relatively low temperatures under conditions of regulated air supply or other temperature control until the more readily liberated sulphur has been driven off, then heating the material at higher temperature ranges of 1000° F., more or less, to obtain approximately the maximum sulphating action, and thereafter heating said material at temperatures of higher range; all being under 1200° F., whereby the persisting iron sulphates are finally decomposed, the temperature changes from stage to stage being relatively abrupt, substantially as set forth.

3. The herein described method of treating and roasting ores and concentrates containing principally the sulphide minerals of copper and iron, which consists, first, in heating the same with a carefully controlled supply of air or other temperature control below 750° F., more or less, until the more readily liberated sulphur has been driven off; next, in heating the same with an adequate supply of air at temperature ranges approximating 1000° F., more or less, until the remaining sulphur which will form $SO_2$ is eliminated; and finally, in heating the material at still higher temperatures, but below 1200° F., until the combined iron is decomposed to form ferric oxide, the respective temperature ranges being established with relative rapidity from stage to stage, substantially as set forth.

4. The herein described method of treating ores and concentrates containing sulphide minerals including iron, which consists in initially driving off at relatively low temperatures the loosely combined sulphur while controlling exothermic action, next, driving off additional sulphur at a higher temperature range maintained substantially static at 1000° F., more or less, to insure approximately a maximum sulphating action, and finally, heating the mineral at a higher temperature range, under 1200° F., until the persisting iron sulphates substantially are decomposed to form ferric oxide, the successive changes to higher temperature stages being relatively rapid, substantially as set forth.

5. The herein described method of treating ores and concentrates containing sulphide minerals including iron, which consists in initially driving off the loosely combined sulphur while controlling exothermic action with restricted air supply or other temperature control and relatively low treating temperature, next, driving off additional sulphur with adequate air supply at a temperature range approximating 1000° F., more or less, and finally, heating the mineral at a higher temperature range, under 1200° F., until the persisting iron sulphates substantially are decomposed to form ferric oxide, the successive changes to higher temperature stages being relatively rapid, substantially as set forth.

6. In a method of treating ores and concentrates containing sulphide minerals including iron, an intermediate stage in a three-stage roasting treatment at successively maintained and quickly established higher temperature ranges, consisting in heating the mineral until the bulk of the persisting sulphur which will form $SO_2$ has been driven off at a temperature maintained substantially static between 975° F. to 1025° F. to insure approximately the maximum sulphating action with the formation of sulphur trioxide, substantially as set forth.

7. In a method of treating ores and concentrates containing sulphide minerals including iron, an intermediate stage in a three-stage roasting treatment at successively maintained and quickly established higher temperature ranges, consisting in heating the ores and concentrates at 1000° F., more or less, until the remaining sulphur which may be eliminated as $SO_2$ is substantially eliminated, maintaining throughout said stage temperatures which will produce substantially maximum conversion to $SO_3$ of the $SO_2$ formed.

8. In a method of treating ores and concentrates containing sulphide minerals including iron, an intermediate stage in a three-stage roasting treatment at successively maintained higher temperature ranges with relatively rapid changes from stage to stage, consisting in heating the ores and concentrates at 1000° F., more or less, until the remaining sulphur which may be eliminated as $SO_2$ is substantially eliminated, maintaining throughout said stage temperatures which will produce substantially maximum conversion to $SO_3$ of the $SO_2$ formed and at the same time will not cause an injurious decomposition of the iron compounds.

9. The method of treating metalliferous sulphides, which consists in heating the same under conditions whereby exothermic action substantially is controlled, whereby the more readily liberated sulphur is driven off, then rapidly raising the temperature of the material to a stage approximating 1000° F. for the maximum sulphating action under conditions furthering the same, and thereafter heating said material at temperatures under 1200° F. until the persisting iron sulphates are decomposed, substantially as set forth.

10. In a method of treating high grade ores and concentrates containing sulphide minerals including iron, an intermediate stage following the removal of one sulphur atom at a controlled lower temperature range, consisting in heating the sulphide minerals at a higher substantially static and quickly attained temperature maintained under 1040° F. to prevent the formation of soluble magnetic oxides of iron during the elimination of the persisting sulphur in the treated mineral, substantially as set forth.

11. In a method of treating high grade ores and concentrates containing sulphide minerals including iron, an intermediate stage in a three-stage roasting treatment at successively maintained and relatively static temperature ranges, consisting in heating the mineral approximately at 1000° F., more or less, maintained to insure the maximum sulphating action with the formation of sulphur trioxide, the temperature changes from stage to stage being relatively rapid, substantially as set forth.

12. The herein described method of treating and roasting high grade ores and concentrates containing principally the sulphide minerals of copper and iron, which consists, first, in heating the same with a carefully controlled supply of air, approximately at 725° F., more or less, until the loosely bound sulphur is driven off, next, in heating the same with an adequate supply of air at a substantially static temperature maintained between 975° F. and 1040° F. and finally, in heating the material at a substantially static temperature maintained below 1200 F., until the combined iron is decomposed to form ferric oxide, the temperature changes from stage to stage being relatively rapid, substantially as set forth.

In testimony whereof I do now affix my signature.

HERBERT E. WETHERBEE.